United States Patent [19]

Poutet

[11] Patent Number: 5,445,485
[45] Date of Patent: Aug. 29, 1995

[54] APPARATUS FOR HANDLING ROLLING PALLETS, PARTICULARLY IN RACK STORAGE FACILITIES

[75] Inventor: Jean C. Poutet, Stuttgart, Germany

[73] Assignee: Züblin-Systemtechnik GmbH für Lager-und Transportanlagen, Stuttgart, Germany

[21] Appl. No.: 96,035

[22] Filed: Jul. 22, 1993

[30] Foreign Application Priority Data

Jul. 22, 1992 [DE] Germany .......................... 42 24 168.5

[51] Int. Cl.⁶ .............................................. B65G 1/04
[52] U.S. Cl. ...................................... 414/280; 414/286
[58] Field of Search ............... 414/277, 279, 286, 400, 414/280–283, 233, 234, 239, 240; 198/465.1, 795, 465.2, 465.3

[56] References Cited

U.S. PATENT DOCUMENTS

| | | | |
|---|---|---|---|
| 1,931,402 | 10/1933 | Black | 414/239 |
| 2,907,479 | 10/1959 | Cunningham | 414/286 |
| 3,418,084 | 12/1968 | Allington | 198/465.2 X |
| 3,883,008 | 5/1975 | Castaldi | 414/280 X |
| 3,921,828 | 11/1975 | Suizu | 414/281 X |
| 3,978,995 | 9/1976 | Zollinger et al. | 414/279 |
| 4,148,404 | 4/1979 | Heisler | 414/280 X |
| 4,284,188 | 8/1981 | Gram | 198/465.3 |
| 5,002,449 | 3/1991 | Kita et al. | 414/279 X |
| 5,032,053 | 7/1991 | Krieg | 414/280 X |
| 5,253,745 | 10/1993 | van den Bergh et al. | 198/795 X |

FOREIGN PATENT DOCUMENTS

| | | | |
|---|---|---|---|
| 623142 | 10/1962 | Belgium | 414/239 |
| 0126431 | 11/1984 | European Pat. Off. | |
| 2509271 | 1/1983 | France | |
| 659994 | 3/1987 | Switzerland | |
| 1481145 | 5/1989 | U.S.S.R. | 414/280 |

Primary Examiner—David A. Bucci

[57] ABSTRACT

An apparatus for handling rolling pallets which are mechanically coupled with one another in rack or flow channels and which is outfitted with a displacement carriage which is movable in a rack servicing lane, which apparatus enables a simple coupling and uncoupling of rolling pallets on the one hand and on the other hand makes possible a simple charging or unloading of rack or flow channels with individual or coupled rolling pallets, wherein the inevitable tolerance-related problems occurring with positive-locking engagement can be reliably controlled under practical conditions. This is accomplished by a working ram at a displacement carriage that is outfitted with at least one swivelable driver for a frictionally-engaging and/or positively-engaging coupling of a rolling pallet after the latter has been partially driven underneath. The mechanical couplings of the individual rolling pallets are outfitted with engagement members substantially located in a horizontal plane, and a control is provided which offsets the displacement carriage in the rack lane direction by the coupling distance for coupling and uncoupling the engagement members.

19 Claims, 13 Drawing Sheets

APPARATUS FOR HANDLING ROLLING PALLETS, PARTICULARLY IN RACK STORAGE FACILITIES

BACKGROUND OF THE INVENTION

1. Field of the Invention

The invention is directed to an apparatus for handling rolling pallets.

2. Description of the Related Art

A trolley vehicle for storing and retrieving loading carriers carrying storage materials is known from DE-A 39 21 123. The rolling pallets in this trolley vehicle are provided at one end side with a hook profile which opens upward and at the opposite end side with a hook profile which opens downward. Adjacent rolling pallets can be hooked together by these profiles so as to form a pull or push train. For the purpose of coupling or uncoupling, the trolley vehicle can raise a lowered front region of a rolling pallet for hooking into the hook profile the adjacent rolling pallet on the trolley vehicle and can move the rolling pallet train in the desired direction via a traction mechanism. A particular disadvantage of the known solution that rolling pallets which may possibly be provided with heavy loads must be lifted, at least in part, for the purpose of coupling. The front end sides of the rack channels must also be guided far enough into the traveling area of the trolley vehicle so that the trolley vehicle or rolling pallet located thereon can move underneath the ends of these rack channels. Another disadvantage of the coupling arrangement provided in DE-A 39 21 123 is that the rolling pallets are not constructed in a symmetrical manner. Consequently, an individual rolling pallet which is turned by 180° cannot be coupled with a rolling pallet situated in the original running direction.

In FR-A-2 509 271 a working ram at a transfer or take-over vehicle is provided with a swivelable driver for coupling with a pallet in a positive engagement after the latter has been driven partially underneath. In this case also, the transported goods must be lifted for removal.

All of the known solutions for coupling rolling pallets have a critical disadvantage in that the rolling pallets to be coupled or uncoupled must be located in an exactly defined position for the coupling/uncoupling process to be carried out at all.

An unlocking mechanism operating via a connecting-link face at the unloading vehicle is known from CH-659 994, wherein displacement carriages with a friction-wheel drive for uncoupled rolling pallets are known from practice as constructions of the present Applicant.

SUMMARY OF THE PRESENT INVENTION

Accordingly, it is an object of the present invention to provide a solution which enables a simple coupling and uncoupling of rolling pallets on the one hand, and on the other hand, makes possible a simple charging or unloading of rack or flow channels with individual or coupled rolling pallets, wherein the inevitable tolerance-related problems occurring with positive-locking engagement can be reliably controlled under practical conditions.

Pursuant to this object and others which will become apparent hereafter, one aspect of the present invention resides in an apparatus of the generic type in which the working ram at the displacement carriage is outfitted with at least one swivelable driver or dog for a frictionally-engaging and/or positively-engaging coupling of a rolling pallet after the latter has been partially driven underneath. The mechanical couplings of the individual rolling pallets are outfitted with engagement members substantially located in a horizontal plane, and a control is provided which offsets the displacement carriage in the rack lane direction by the coupling distance for coupling and uncoupling the engagement members.

Due to the working ram which is outfitted with swivelable drivers, it is possible, proceeding from the handling apparatus, i.e. for example the displacement carriage, to engage under a rolling pallet located in the front end region of a channel and to push this rolling pallet at least partially into the operating or servicing lane on the apparatus by means of the ram or rams. More exact positioning can then be effected, in a manner known per se, via a friction- and brake-wheel drive. The engagement members lying substantially in a horizontal plane enable a simple coupling or uncoupling of rolling pallets and the provided control unit can offset the displacement carriage by the corresponding engagement distance. Thus, for the purpose of coupling and uncoupling, it is possible to carry out a movement of the displacement carriage or its corresponding members and/or of the rolling pallet located thereon in a computer-controlled manner in the rack servicing lane direction as well as in the channel direction simultaneously, which drastically curtails the work times involved. Moreover, the control unit of the displacement carriage is outfitted in such a way that it can detect the exact location of the rolling pallet to be coupled or uncoupled during the transporting movement in the channel direction. Accordingly, it is no longer necessary for the rolling pallet to stand in an exactly defined position in order to carry out the coupling/uncoupling process.

It is noted here that coupling members which hook together are known in general form from EP-B 0 126 431.

In a further embodiment of the invention, the drivers are constructed as double-action pawls and/or driver pins which can swivel up and down, the respective rolling pallets being equipped, according to the invention, with rungs in the working path of the pawls or with receiving recesses in the working path of the driver pins.

In order to pre-position the rolling pallets within a defined tolerance zone, the invention also provides that the first/last location of a rack channel facing the displacement carriage is outfitted with an after-running safety which can be actuated by the displacement carriage.

This after-running safety can be a catch clip which is swivelable by a ram at the displacement carriage or can be a friction-bar/friction-wheel drive which can also be actuated by a ram at the displacement carriage.

In a further embodiment, the invention provides that every rolling pallet is outfitted along its center axis at the end side with a coupling having at least one engagement pawl and a corresponding engagement recess which are arranged so as to be symmetrical with respect to turnover or reversal and point-symmetrical, respectively.

In so doing, the engagement pawl is advisably outfitted with side flanks converging toward its rounded free end and the engagement recess is outfitted with side flanks converging toward the rounded base of the recess.

There are a number of advantages to the design of the interlocking couplings upon which the invention is based.

On the one hand, relatively great engagement tolerances can be compensated for in the coupling process during transverse movement by means of the tooth-like, rounded construction. On the other hand, the geometric construction ensures that practically no play occurs in the channel direction after the rolling pallets have been coupled.

Furthermore, the geometric angle of inclination of the tooth-like coupling member is advantageously selected in such a way that it is less than the friction angle inherent to the work material which is employed. Accordingly, the diagonal resulting driven forces cannot lead to jamming, since forces acting transversely to the channel direction cannot be absorbed in the coupling member.

The invention also provides that every coupling is outfitted with a spacer stop for contacting the front end surfaces of a coupled rolling pallet. As a result of this spacer stop, every rolling pallet can be supported against the adjacent rolling pallet, which makes it easier to bring them into proximity when coupling. This simultaneously prevents the coupled rolling pallets from rotating relative to one another.

The invention also provides that the couplings at the rolling pallets which engage one inside the other in the manner of teeth can be outfitted with damping elements so as to prevent noise, etc.

There are a number of ways to design the damping elements. For example, according to the invention the damping elements can be constructed as cylinder or roll members arranged in the insertion region of the coupling teeth or as buffer cushions or the engagement members themselves can be constructed from highly wear-resistant plastic with sliding properties.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
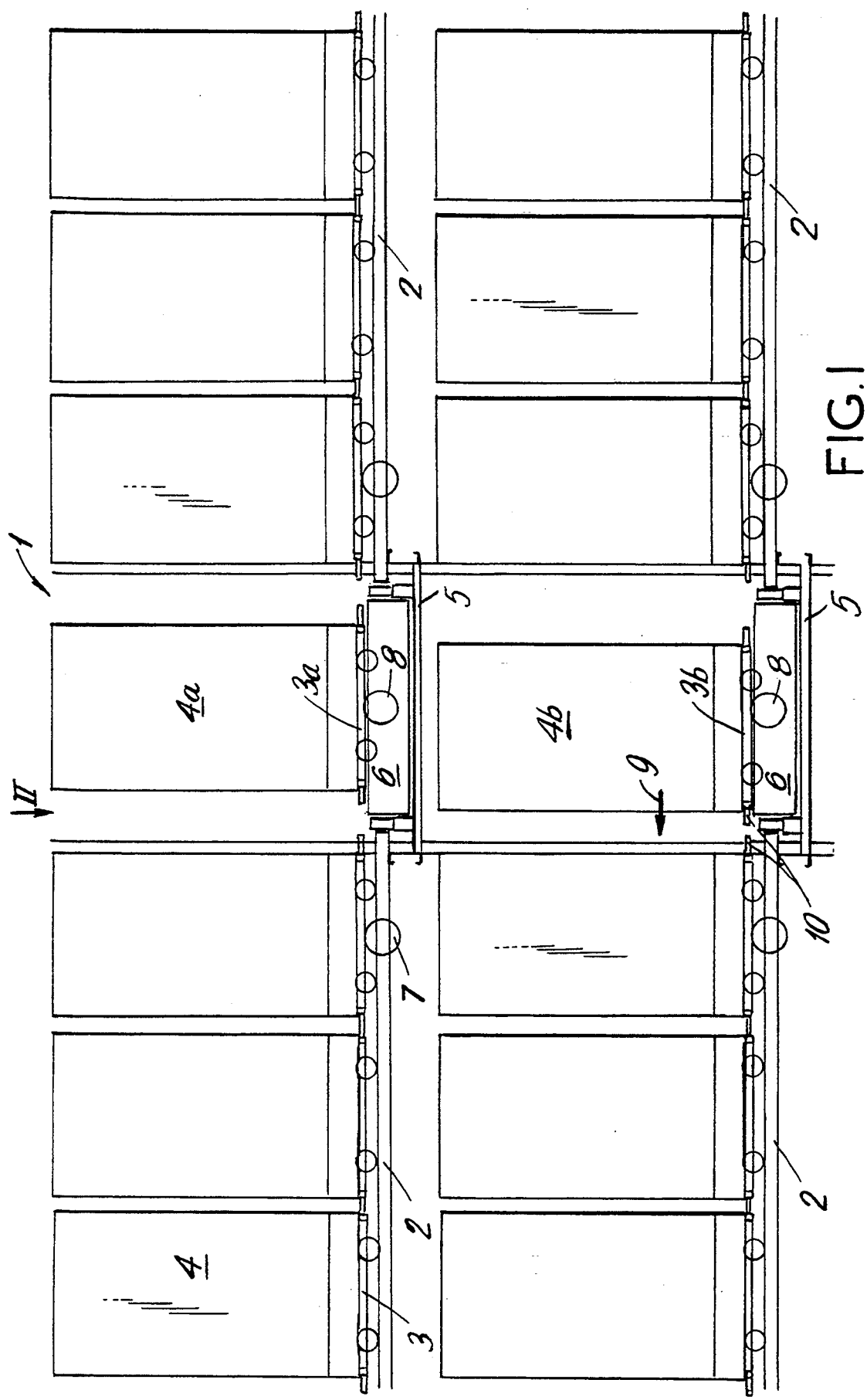
FIG. 1 shows a side view of a rack with two rack lanes.

The apparatus shown in side view in FIG. 1 is designated in general by the numeral 1. It is substantially formed from rack or flow channels 2 equipped with rolling pallets 3 carrying goods 4, which are not discussed in more detail, as well as by rack servicing or access lanes 5 with displacement carriages 6.

Figure 2:
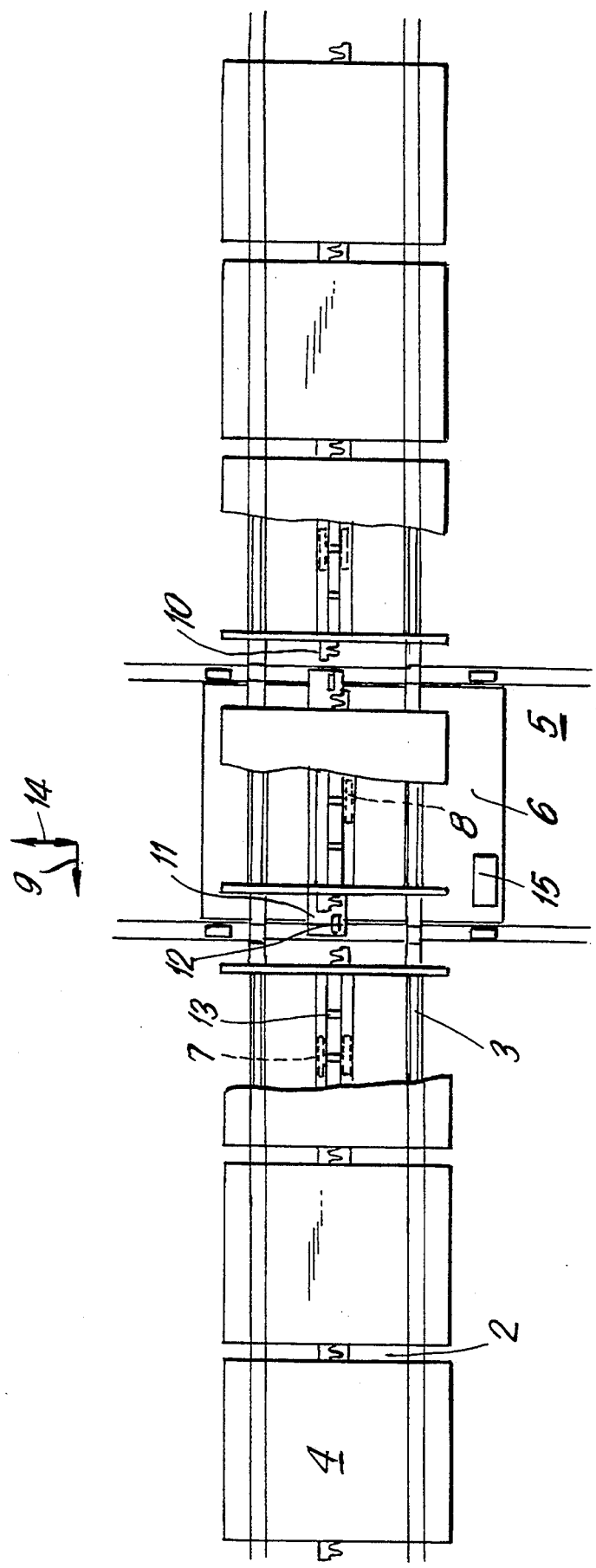
FIG. 2 shows a top view according to arrow II in FIG. 1.

In the embodiment according to FIGS. 1 and 2, the front end of every channel 2 is outfitted with a friction wheel 7 as an after-running safety. The displacement carriage 6 likewise has positioning means 8, e.g. a friction or brake wheel, for raising the rolling pallet 3a at least along a partial area and centering it or pushing it. In the lower portion of FIG. 1, a small arrow 9 indicates that a rolling pallet 3b supporting a load 4b is already displaced in the direction of a lane 2. In so doing, the displacement carriage 6 can be located behind the drawing plane. In approaching the rack lane 2 in the drawing plane, the couplings 10 of the rolling pallets 3 are hooked one into the other. This approaching position is shown from the top in FIG. 5.

Figure 9:
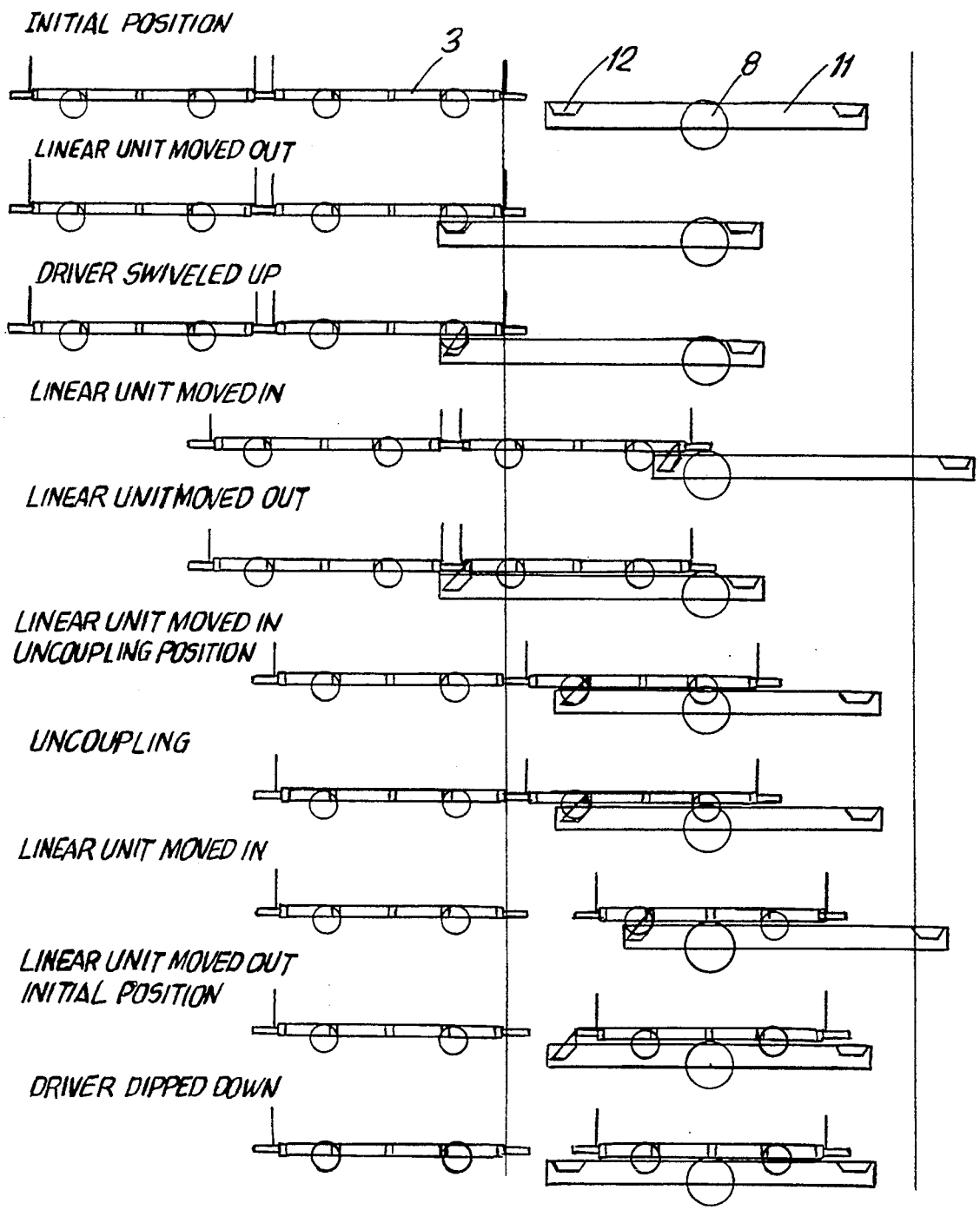
FIG. 9 shows individual phases of receiving a rolling pallet.
Figure 10:
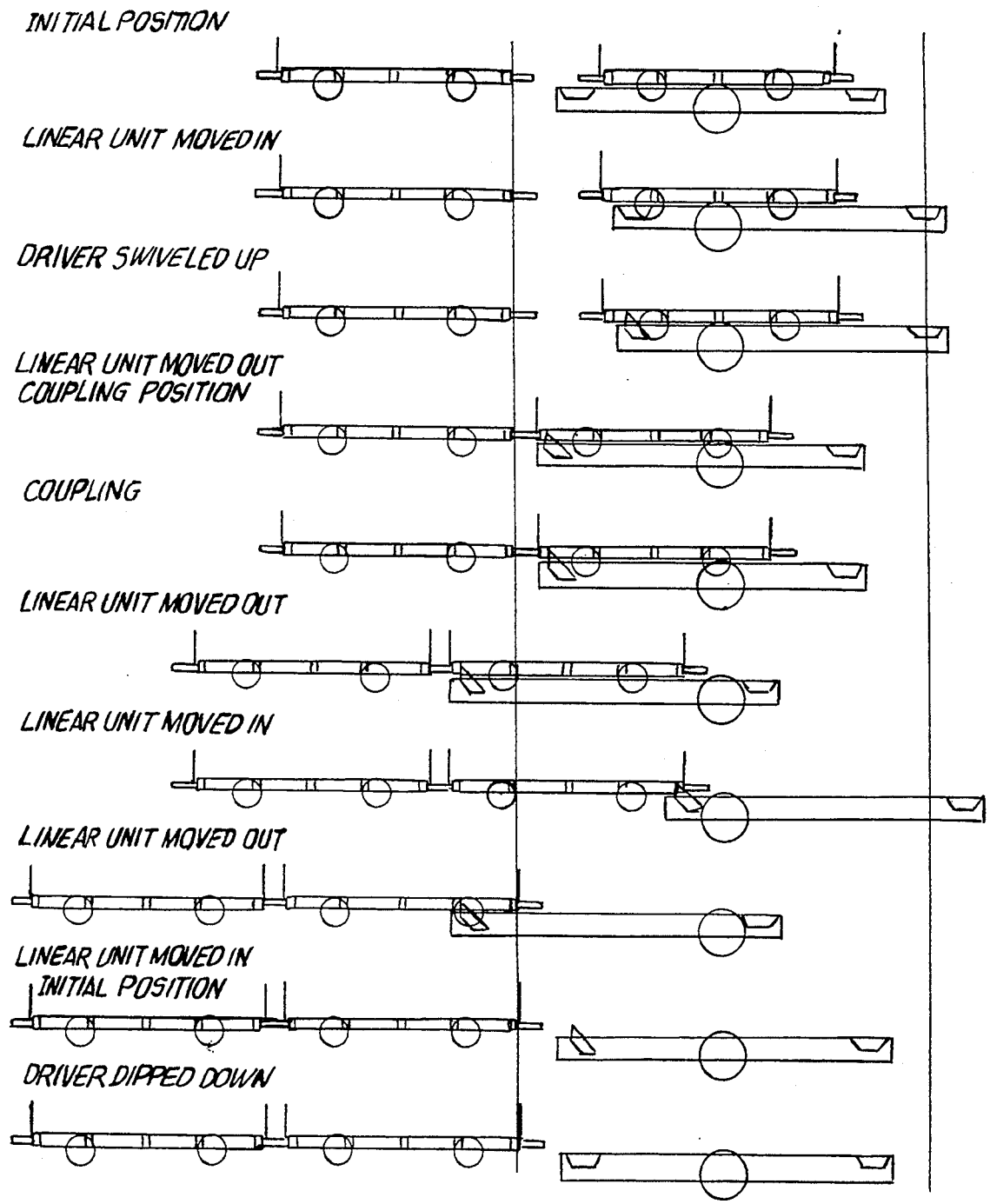
FIG. 10 shows individual phases of the release of the rolling pallet in a first embodiment.

As shown in FIG. 2, the displacement carriage 6 is outfitted with a working ram 11 having drivers 12 which can be swiveled up and can be constructed e.g. as double-action pawls which can hook onto transverse rungs 13 at the underside of the rolling pallets 3, e.g. so as to push these rolling pallets 3 into a channel 2 or so as to hoist them from the latter onto the displacement carriage 6. These working positions are shown individually in FIGS. 9 and 10. It can be seen that the rolling pallet located on the displacement carriage 6 can be moved synchronously in the direction of the arrows 9 and 14 indicated in FIG. 2 during the movement of the displacement carriage 6, resulting in a superimposed movement. The advancing times and positioning times of the displacement carriage 6 are accordingly clearly curtailed.

Figure 13A:
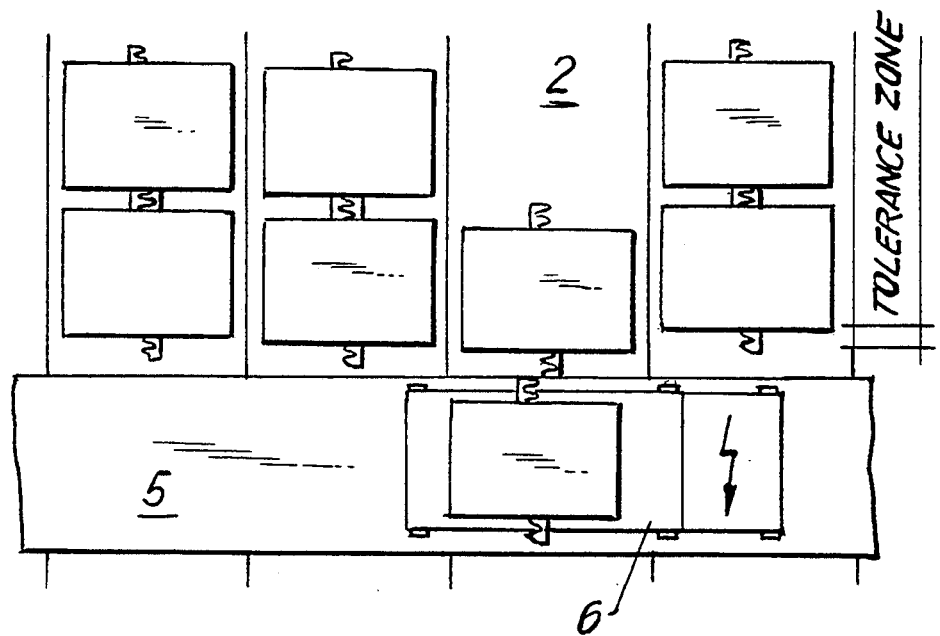
FIGS. 13a–c show a top view of the individual phases in the release of the rolling pallet.
Figures 13B, 13C:
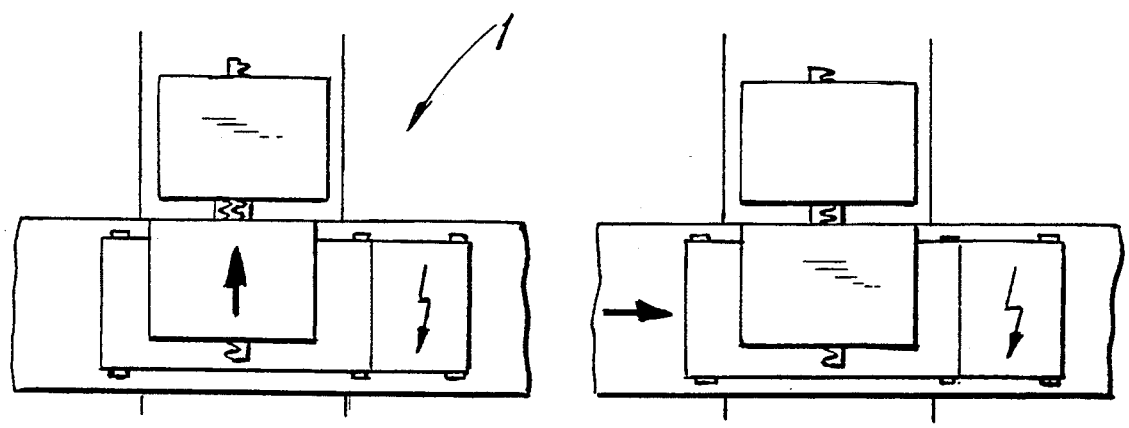

FIGS. 13a–c show the individual phases of the coupling sequence. In phase a), the displacement carriage 6 is laterally offset in front of a channel 2. It can also be seen that all of the pallets 3 of the adjacent channels need not stand flush at one position, but can be located within a tolerance zone. In phase b), the working ram moves (according to arrow 9 in FIG. 2) toward the current position of the rolling pallet to be coupled. This position is detected by the control unit. The coupling process is concluded in phase c) in that the displacement carriage is positioned in the final delivery or release position (according to arrow 14 in FIG. 2). This concludes the coupling process and the pallet 3 can be completely released into the channel 2.

An electronic control unit for the displacement carriage, which can also be arranged externally, is only indicated in FIG. 2 suggestively as a box 15.

Figure 3:
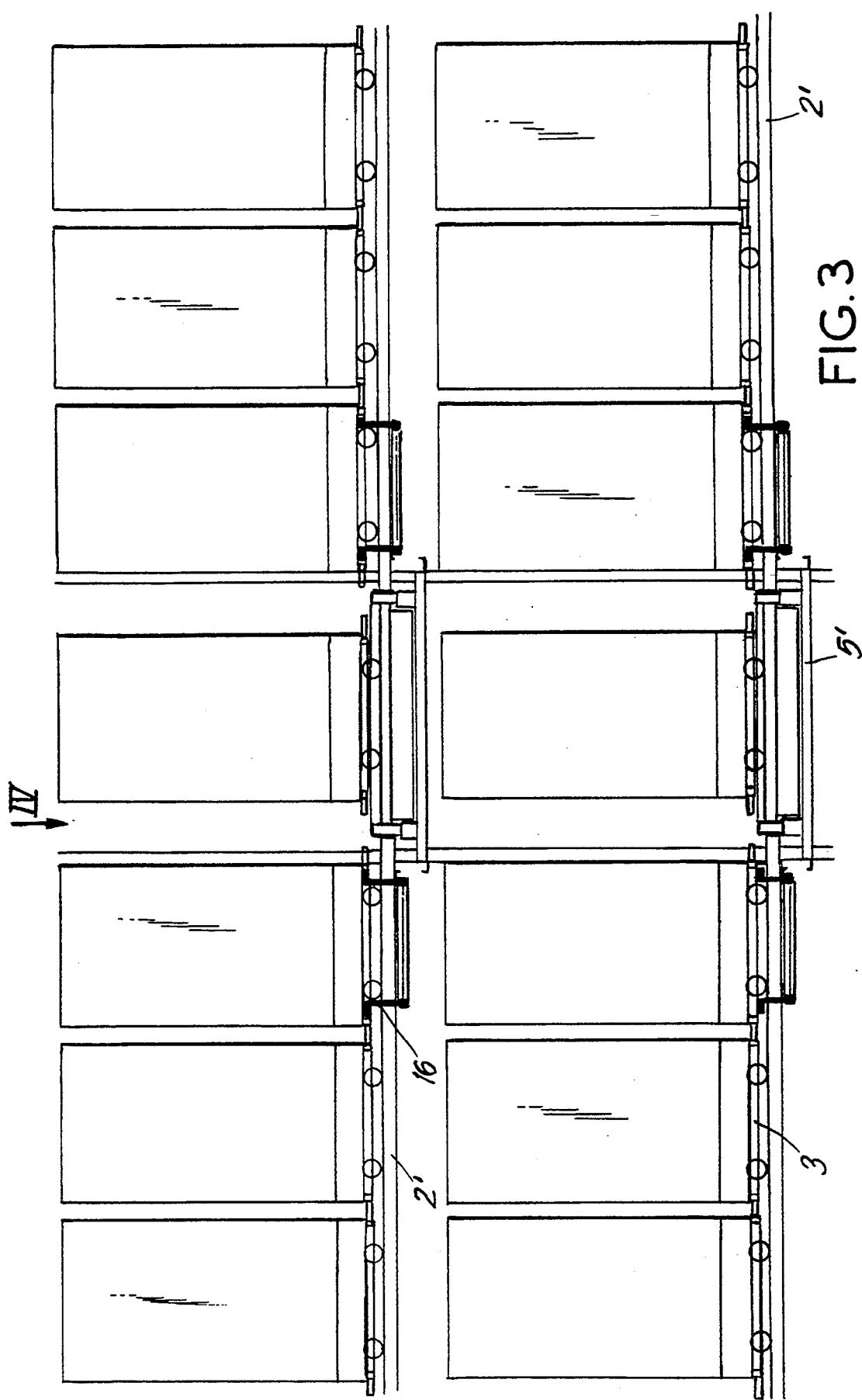
FIG. 3 shows a side view of a rack in modified construction.
Figure 4:
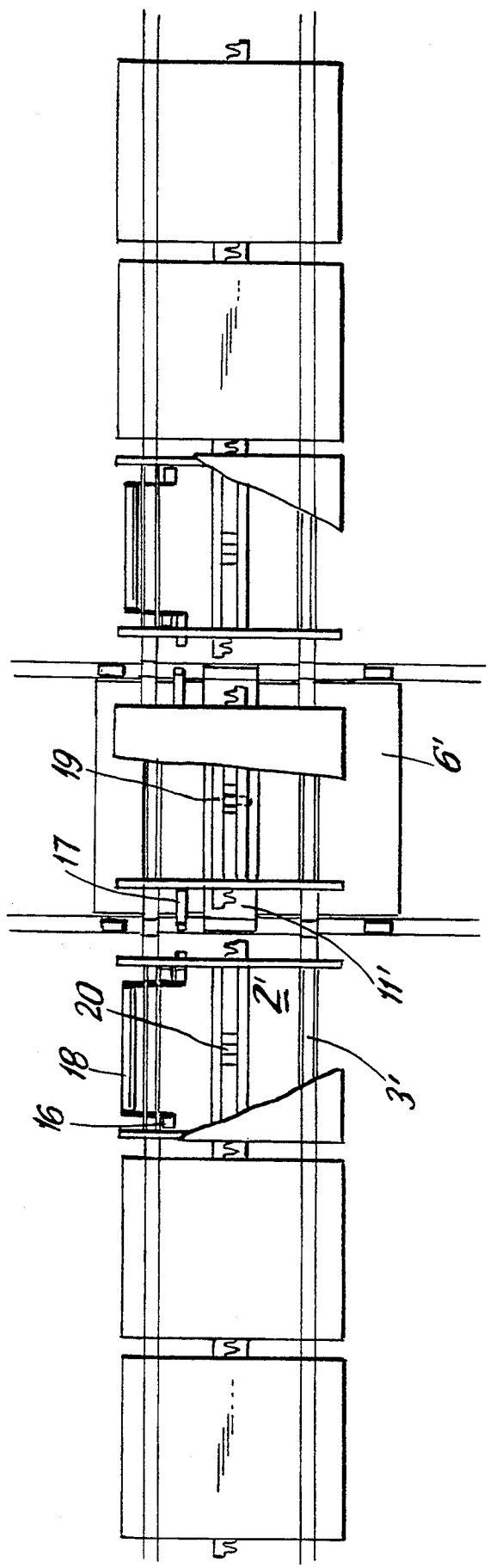
FIG. 4 shows a top view according to arrow IV in FIG. 3.

A modified embodiment of the invention, particularly with respect to an after-running safety in the channels 2', is shown in FIGS. 3 and 4. This after-running safety is in the form of detent pawls 16 acting at both sides which are shown in the engaged state in FIG. 3 at the upper left and right and shown as swiveled out of the movement path of the rolling pallets 3 in FIG. 3 at the lower left. In order to actuate these detent pawls 16, the displacement carriage 6' is outfitted in the embodiment shown in FIG. 3 and FIG. 4 with an actuating ram 17 whose thrusting movement in the direction of the channel 2' causes the swiveling of the detent pawls 16 around an axis 18.

Moreover, the working ram 11' has only one central driver pin 19 in this instance. The rolling pallets 3' are provided with a central engagement catch 20 into which the pin 19 can be moved. The individual working positions and work phases are shown in more detail in FIGS. 11, 12, 14, and 15.

Figure 5:
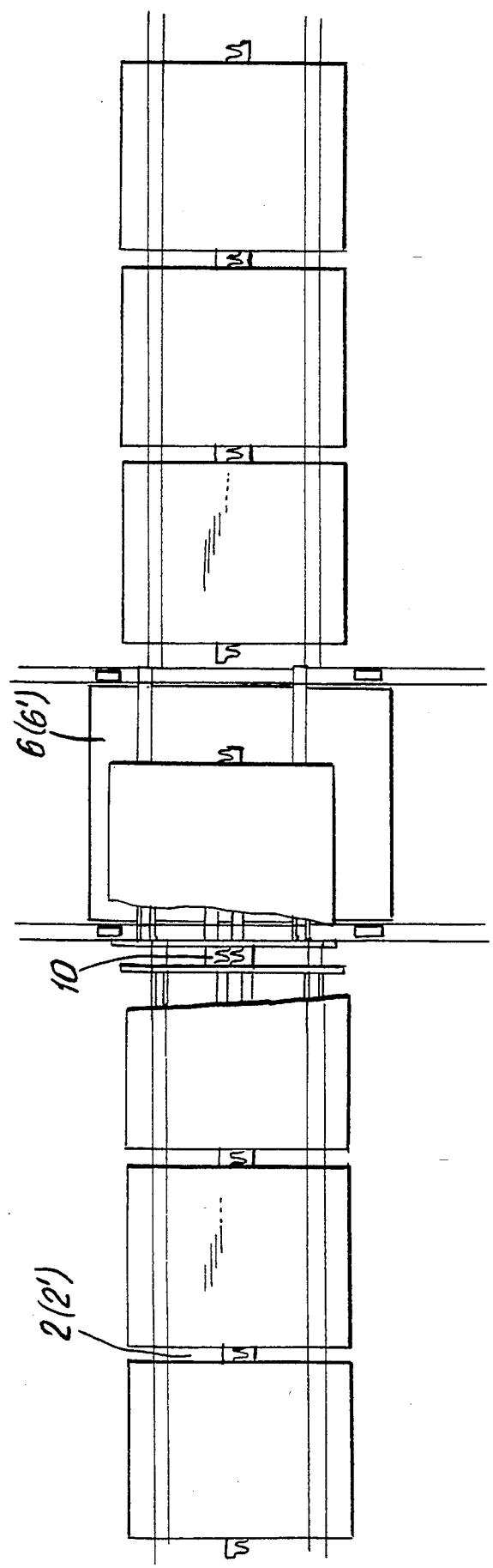
FIG. 5 shows a top view in a coupling process of two rolling pallets.

As already indicated above, the relative position of the elements shortly before the engagement of the couplings 10 is shown in FIG. 5. It can be seen that the displacement carriage 6 or 6' is not yet exactly in the position in which it is flush with the channels 2 and 2'. Also, the drawings show that all rolling pallets 3 and 3' are outfitted with a coupling member only in the center. The construction of these coupling members 10 follows from FIGS. 6 to 8.

Figure 6A:
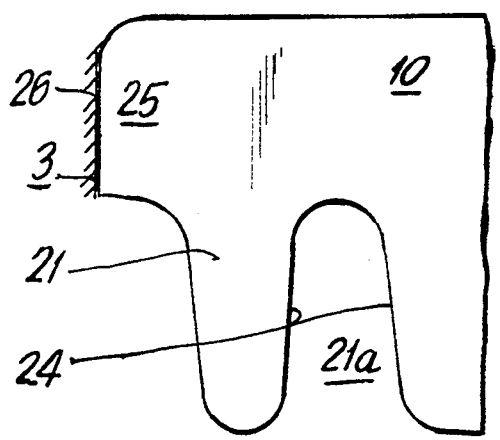
FIG. 6a shows the couplings in the uncoupled state according to an embodiment of the present invention.
Figure 6B:
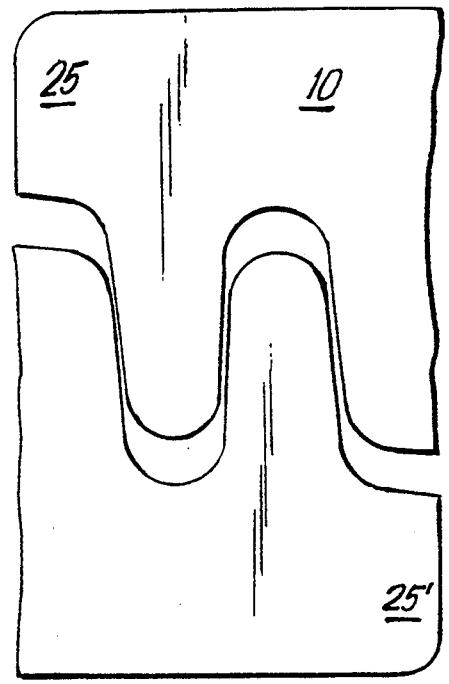
FIG. 6b shows the same couplings in the coupled state.

FIGS. 6a and 6b show a coupling 10 in a position in which it is not yet coupled and in a completely coupled position, respectively. The couplings 10 are outfitted with engagement pawls or teeth 21 and 21' respectively, which engage in corresponding engagement recesses 21a in the coupled position (FIG. 6b). The engagement pawls 21 are provided with a rounded free end and the corresponding engagement recesses are provided with a rounded recess base. As can be seen from the drawings, the engagement pawls 21 and the corresponding engagement recesses 21a have side flanks 24 and 24' which converge toward the free end and toward the recess base, respectively. The angle of inclination of the side flanks is less than the friction angle resulting from the employed work material.

Moreover, every coupling member 10 has a spacer stop 25 and 25' respectively, at its free end, which faces outward. This spacer stop 25, 25' can support a rolling pallet 3 at its end faces 25 or the rolling pallet 3 can slide along the latter. As shown in FIGS. 6a and 6b, the rolling pallets are also prevented from turning in the horizontal plane in the coupled position by the front stops 25 and 25'.

Figure 7:
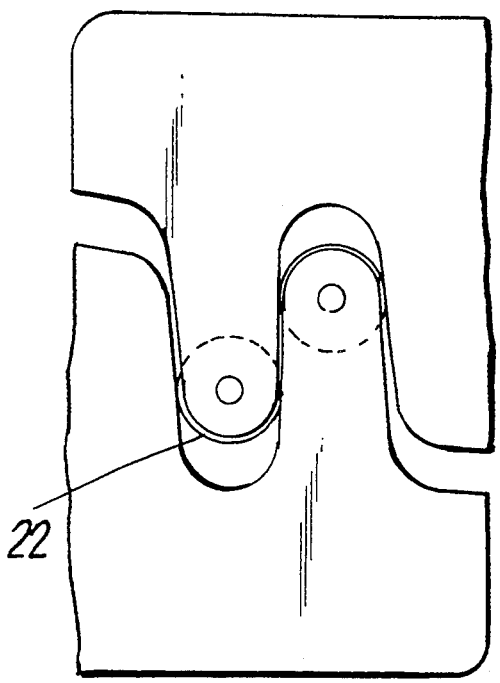
FIG. 7 shows a modified embodiment form of the couplings.
Figure 8:
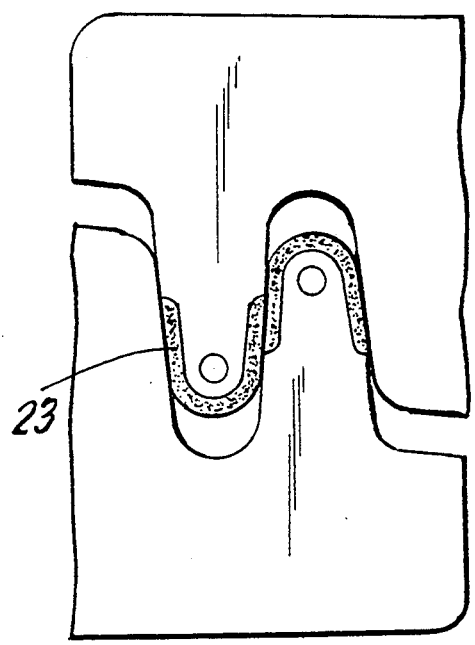
FIG. 8 shows a further modified embodiment of the couplings.

To improve the coupling possibilities, particularly for a sound-damping effect, e.g. rubber rolls 22 or rubber or plastic linings 23 can be provided in the front regions as indicated in FIGS. 7 and 8. The engagement teeth 21 and 21' themselves can also be manufactured from a highly wear-resistant plastic, which is not shown here in more detail.

Figure 11:
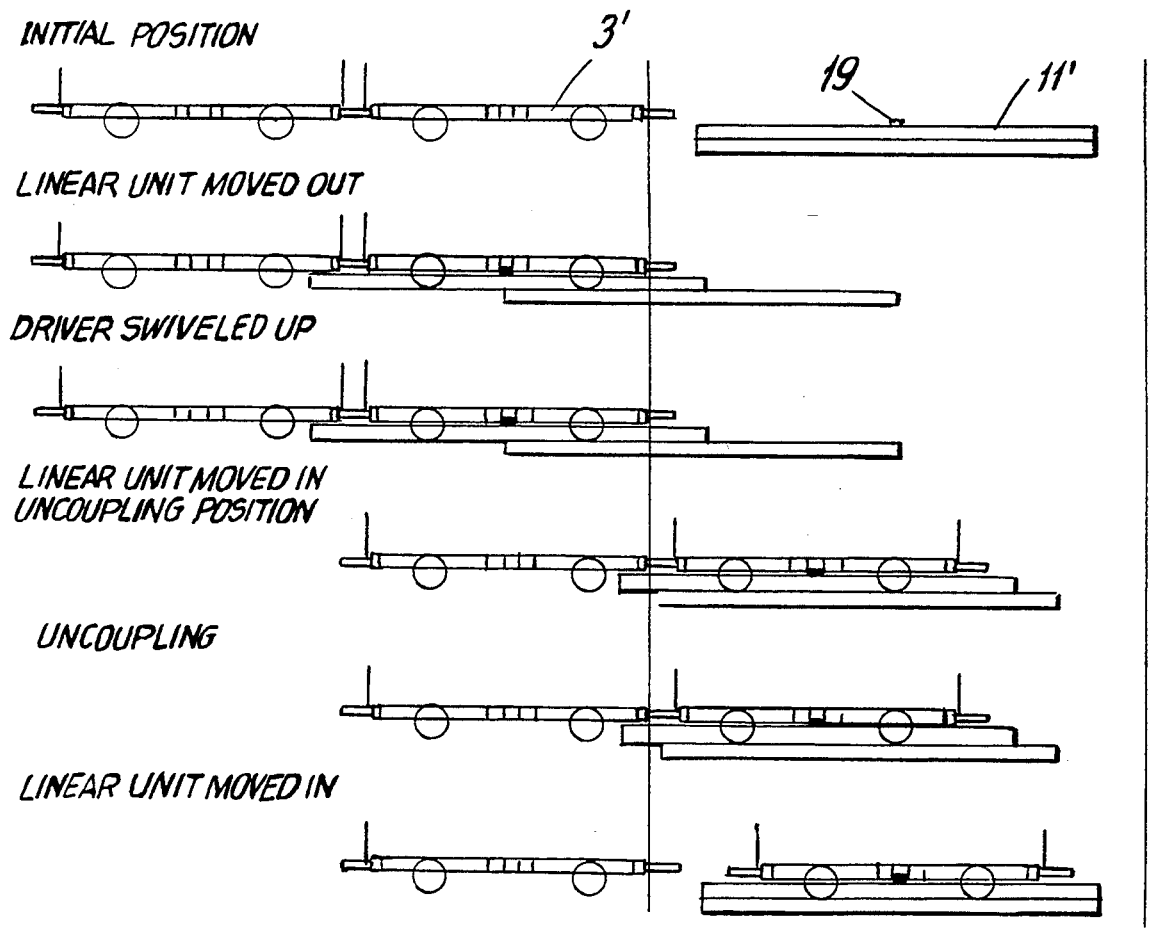
FIG. 11 shows receiving phases of a rolling pallet in another embodiment example.
Figure 12:
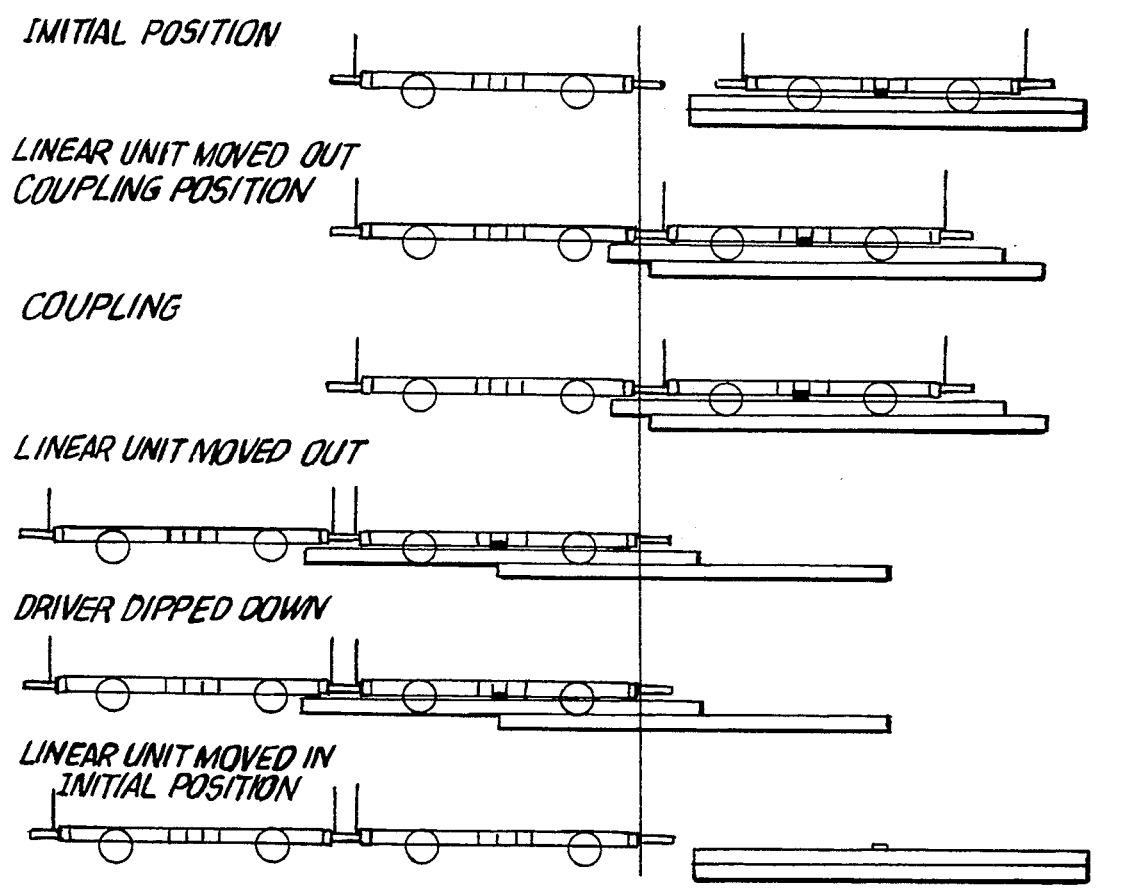
FIG. 12 shows release phases in another constructional variant.

The individual phases of taking over a rolling pallet 3 onto a displacement carriage are shown in FIGS. 9, 10, 11, and 12. For drawing-related reasons, only the working ram 11 of the displacement carriage with a friction wheel 8 and the double-action pawls 12 which can be raised and lowered are shown. Again, only the working ram 11' with its driver pin 19 in different positions is shown in FIGS. 11 and 12. The working ram is designated as "linear unit" in the text of the drawing.

Figure 14:
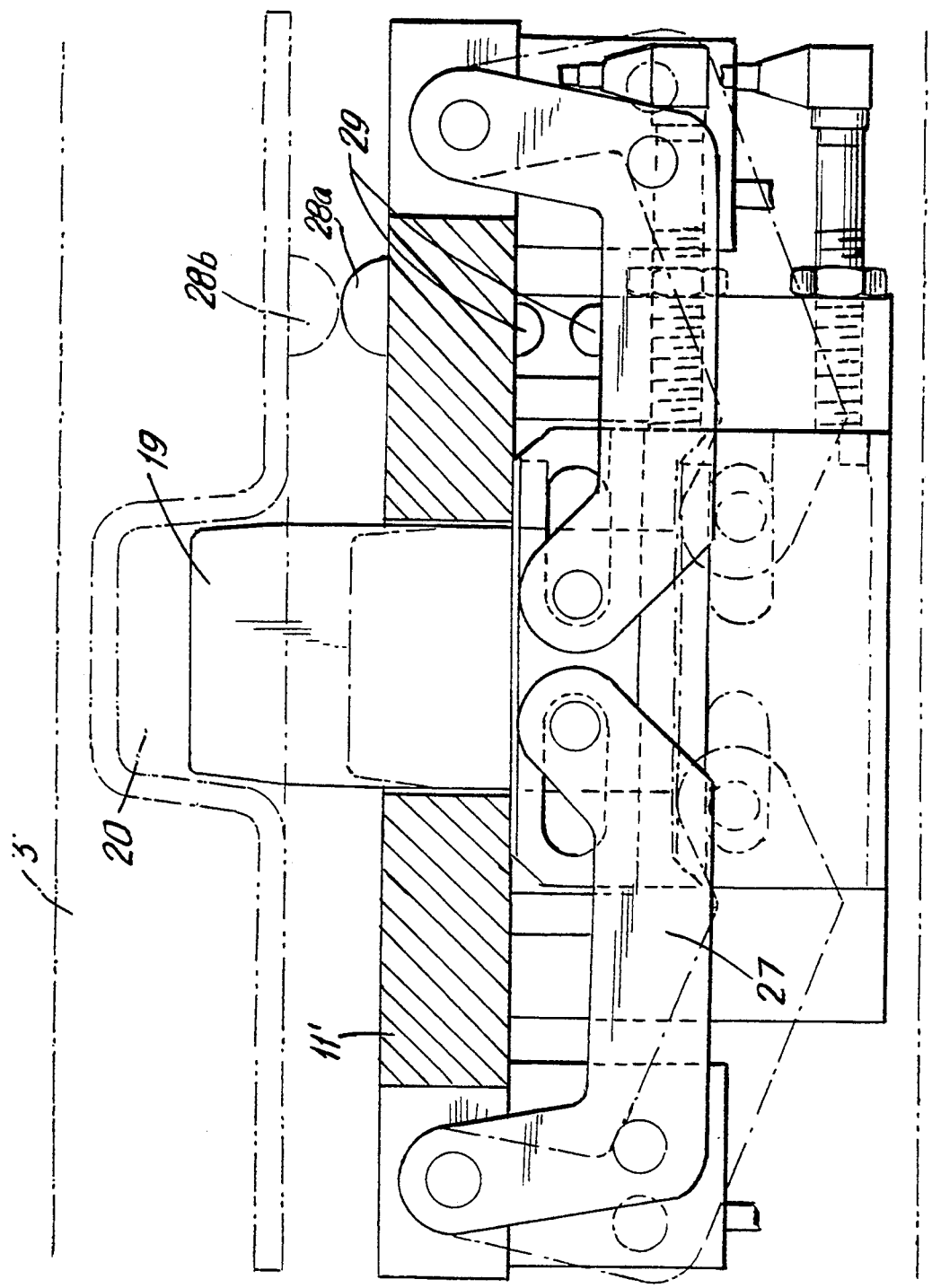
FIG. 14 shows a detail of a driver pin in the coupling position.
Figure 15:
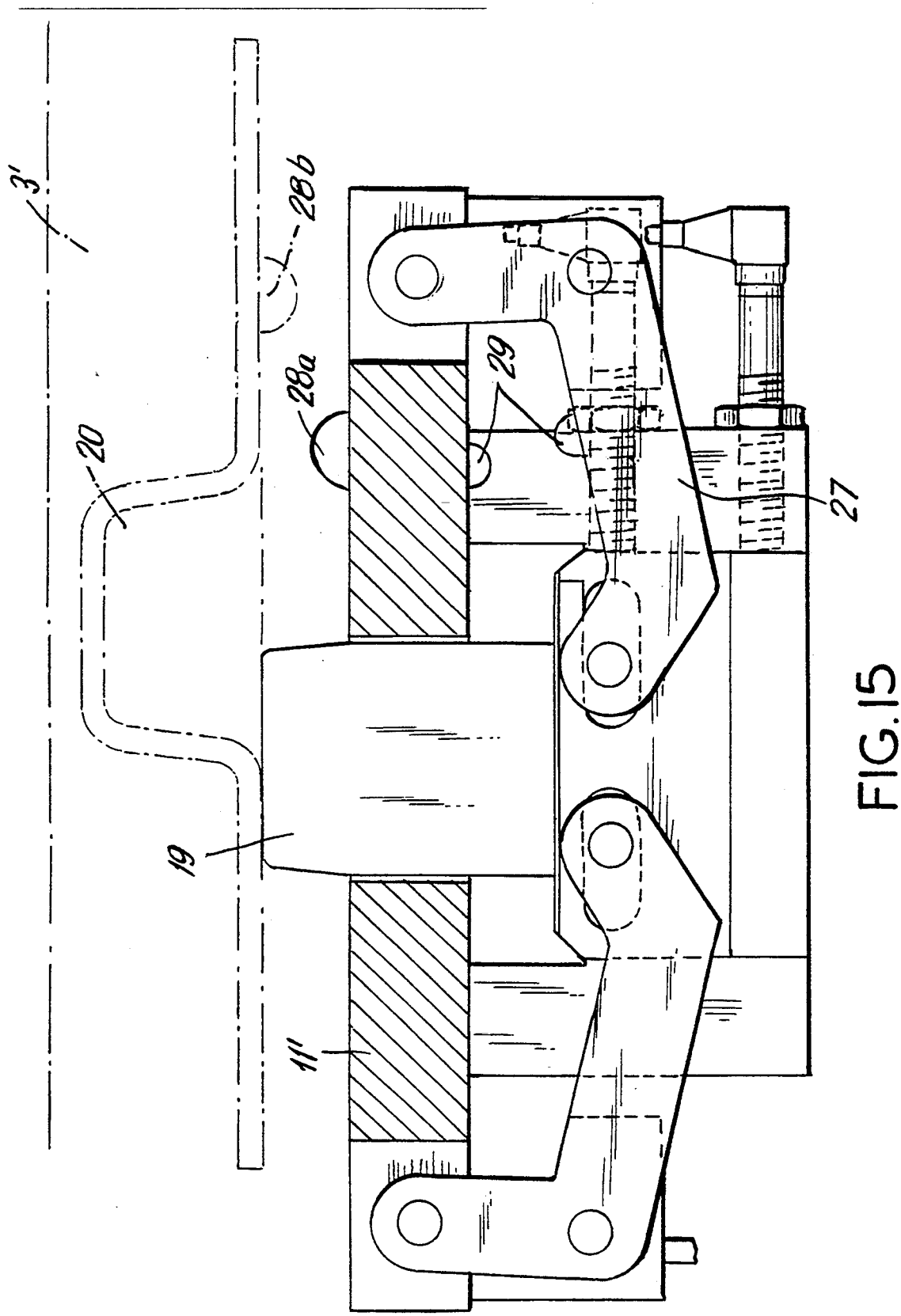
FIG. 15 shows the same detail with the driver pin in an incorrect position.

As shown in FIGS. 14 and 15, the coupling pin 19 can be swiveled out of the lowered position shown in dash-dot lines into the coupling position shown in a solid line via a knee lever 27, specifically when the central engagement catch 20 is located at the rolling pallet 3' in the desired position. An incorrect position is shown in FIG. 15. To prevent this incorrect position, a position inquiry is effected in fully-automatic operation via sensors 28a and 28b which are only indicated in a suggestive manner in the drawing. The moving-out position and full moving-out height of the driver pin 19 is checked via sensors 29 which are likewise not shown in more detail. The control can be effected in such a way that the linear unit 11' is adjusted by moving back and forth until the position of FIG. 14 is reached from position 15 and the control unit is informed of this via the sensor 29 and/or the sensors 28a and 28b. The movement sequences shown in FIGS. 11 and 12 are then effected.

While the invention has been illustrated and described as embodied in an apparatus for handling rolling pallets, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by letters patent is set forth in the appended claims.

1. An apparatus for handling rolling pallets which are mechanically coupled with one another in rack channels, comprising: a displacement carriage which is movable in a rack access lane perpendicular to the rack channels; a working ram connected to the displacement carriage so as to be outwardly movable perpendicularly to the rack access lane and underneath a pallet, the working ram at the displacement carriage having at least one swivelable driver for engaging a rolling pallet after being partially driven underneath the pallet; mechanical couplings of the individual rolling pallets outfitted with engagement members substantially located in a horizontal plane; control means for offsetting the displacement carriage in a rack access lane direction by a coupling distance required for coupling and uncoupling the engagement members and for moving the working ram; and after-running safety means arranged in a first/last location of a rack channel facing the displacement carriage for arresting movement of the rolling pallets in the rack channel, every rolling pallet being outfitted on its center axis at an end side with one of the mechanical couplings, each of the mechanical couplings having at least one engagement pawl and a corresponding engagement recess which are symmetrical to one another, the engagement pawl having side flanks that converge toward a rounded free end, the corresponding engagement recess having side flanks that converge toward a rounded base of the recess, and the side flanks having a geometrical angle of inclination that is less than a friction angle inherent to the pawl material.

2. An apparatus according to claim 1, wherein the driver is a double-action pawl that can swivel up and down.

3. An apparatus according to claim 2, wherein the pawl is a swivelable driver pin.

4. An apparatus according to claim 1, wherein the after-running safety means includes a friction wheel.

5. An apparatus according to claim 1, wherein each of the mechanical coupling is outfitted with a spacer stop for contacting end face surfaces of a coupled rolling pallet.

6. An apparatus according to claim 1, wherein the engagement members are formed at least partially from highly wear-resistant plastic with sliding properties.

7. An apparatus according to claim 1, wherein the after-running safety means includes pawls which swivel about an axis so as to selectively engage and stop a rolling pallet.

8. An apparatus according to claim 1, and further comprising sensor means for detecting position of the working ram and transmitting such data to the control means.

9. An apparatus according to claim 1, and further comprising at least one friction and brake wheel arranged so as to position a rolling pallet on the displacement carriage.

10. An apparatus for handling rolling pallets which are mechanically coupled with one another in rack channels, comprising: a displacement carriage which is movable in a rack access lane perpendicular to the rack channels; a working ram connected to the displacement carriage so as to be outwardly movable perpendicularly to the rack access lane and underneath a pallet, the working ram at the displacement carriage having at least one swivelable driver for engaging a rolling pallet after being partially driven underneath the pallet; mechanical couplings of the individual rolling pallets outfitted with engagement members substantially located in a horizontal plane; control means for offsetting the displacement carriage in a rack access lane direction by a coupling distance required for coupling and uncoupling the engagement members and for moving the working ram; and after-running safety means arranged in a first/last location of a rack channel facing the displacement carriage for arresting movement of the rolling pallets in the rack channel, the mechanical couplings at the rolling pallets having teeth that engage one inside the other, the teeth being outfitted with damping elements, and the damping elements being roll members provided in an insertion region of the teeth.

11. An apparatus according to claim 10, wherein the driver is a double-action pawl that can swivel up and down.

12. An apparatus according to claim 10, wherein the after-running safety means includes a friction wheel.

13. An apparatus according to claim 10, and further comprising sensor means for detecting position of the working ram and transmitting such data to the control means.

14. An apparatus according to claim 10, and further comprising at least one friction and brake wheel arranged so as to position a rolling pallet on the displacement carriage.

15. An apparatus for handling rolling pallets which are mechanically coupled with one another in rack channels, comprising: a displacement carriage which is movable in a rack access lane perpendicular to the rack channels; a working ram connected to the displacement carriage so as to be outwardly movable perpendicularly to the rack access lane and underneath a pallet, the working ram at the displacement carriage having at least one swivelable driver for engaging a rolling pallet after being partially driven underneath the pallet; mechanical couplings of the individual rolling pallets outfitted with engagement members substantially located in a horizontal plane; control means for offsetting the displacement carriage in a rack access lane direction by a coupling distance required for coupling and uncoupling the engagement members and for moving the working ram; and after-running safety means arranged in a first/last location of a rack channel facing the displacement carriage for arresting movement of the rolling pallets in the rack channel, the mechanical couplings at the rolling pallets having teeth that engage one inside the other, the teeth being outfitted with damping elements, and the damping elements being buffer cushions arranged in front regions of the teeth.

16. An apparatus according to claim 15, wherein the driver is a double-action pawl that can swivel up and down.

17. An apparatus according to claim 15, wherein the after-running safety means includes a friction wheel.

18. An apparatus according to claim 15, and further comprising sensor means for detecting position of the working ram and transmitting such data to the control means.

19. An apparatus according to claim 15, and further comprising at least one friction and brake wheel arranged so as to position a rolling pallet on the displacement carriage.

* * * * *